3,430,530
MUSIC SYSTEM
Gerard R. Grindinger, Northridge, Calif., assignor to Warwick Electronics Inc., Chicago, Ill., a corporation of Delaware
Continuation of application Ser. No. 350,349, May 9, 1964. This application Dec. 5, 1967, Ser. No. 688,267
U.S. Cl. 84—471　　　　　　　　　　　　　　3 Claims
Int. Cl. G09b 15/02

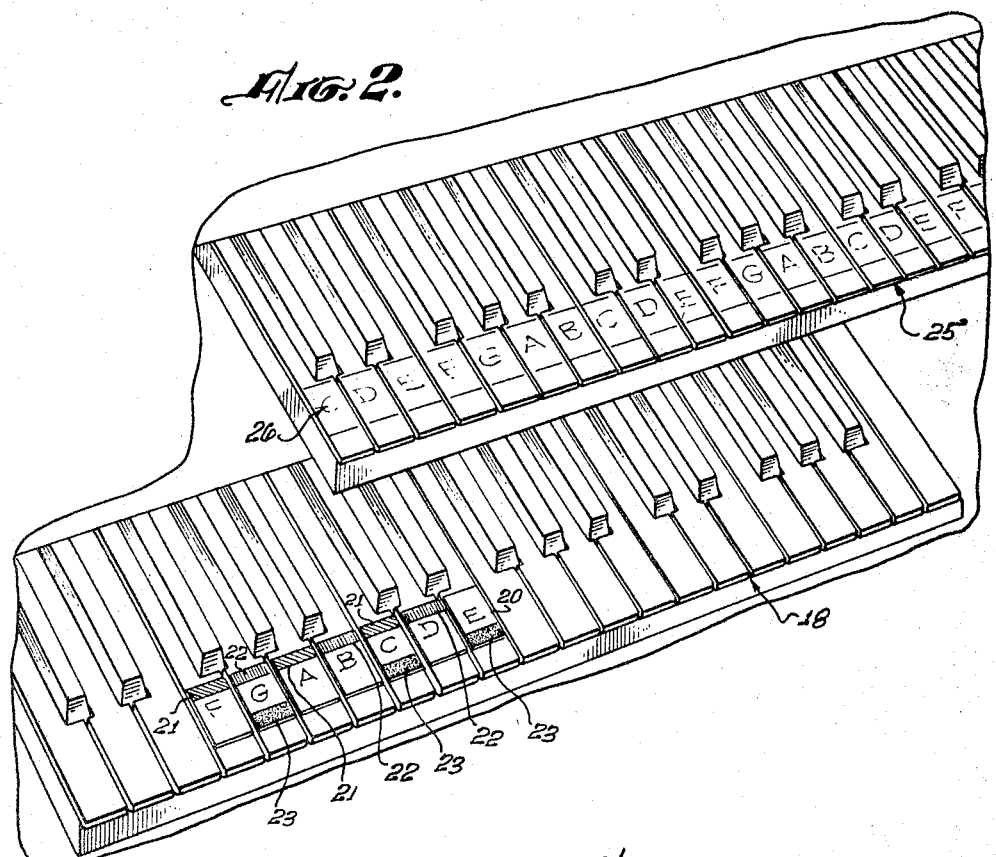

ABSTRACT OF THE DISCLOSURE

A music system instrument having chordally related pluralities of keys illuminable from beneath to glow in the same color, keys of different chords being illuminable in different colors. The musical instrument may be played in conjunction with a musical score having horizontally extending color areas corresponding to the colors of the chords. The color areas extend for the duration of the interval during which the chord corresponding to that color is to be sounded.

---

This application is a continuation of my pending application Ser. No. 350,349, filed May 9, 1964, now abandoned.

This invention relates in general to musical instruments and means to produce pleasing sounds, and it relates more particularly to a related system of an organ instrument and printed scores to permit production by an amateur musician of musical compositions without requiring the ability to read a musical score.

The principal object of the present invention is to enable those without musical instrument training to produce an acceptable and entertaining melody and related background chords.

A further object of this invention is to provide a melody score for the playing of a melody and supporting chord background by dividing the printed score into color coded areas.

For a full understanding of the invention, a detailed description of the preferred embodiment of the music system will now be given in conjunction with the accompanying drawings and the features forming the invention will then be specifically pointed out in the appended claims.

FIGURE 1 is an illustration of a prepared musical score, and

FIGURE 2 is a diagrammatic illustration of a great and a swell manual of an organ embodying the features of this invention.

A portion of sheet music as it appears in a printed form for this invention is illustrated in FIGURE 1. FIGURE 1 illustrates, in the background, blocked areas of color indicating the fact that particular chords are suitable as background for this area of the melody. The combination of the score and color is indicated by the reference character 10 in the drawings. The individual notes on the staff are indicated by the reference character 12, and the letter designations for the notes by the reference character 14. The individual color areas are referred to by reference characters 15 for the grey areas, 16 for the red areas, and 17 for the green areas. The drawing marked into rectangular areas along the score, and fragmentary shading suggests the fact that the entire area is blocked out in solid color.

As an example, employing the portion of the musical score shown in FIGURE 1, the area 17, the green area, suggests the use of the F major chord. Red area 16 suggests the use of the G major chord, and the grey area 15 suggests the C major chord.

Referring to FIGURE 2 of the drawing, there is illustrated schematically a great manual 18 having letters 20 provided in such a manner that a source of light illuminating the translucent key material will make the letters 20 visible to the organist. These letters are within or under the key body and are therefore visible only when the key becomes translucent by lighting. When the light is not employed, the keys have a fully normal appearance.

According to the concept of this invention, many different means for providing the illumination and shadow effect to make visible the letters 20 upon providing illumination, will be acceptable. However, hereafter, reference will be made to internal illumination and this will be understood to embrace all means of causing the forward portion of the translucent keys to become illuminated, whether by actual internal incandescent means, light sources under the keys, or any other such means of illumination other than incident light falling upon the keys from the exterior of the organ. The internal illumination is preferably selectively actuable by means of a conventional switch (not shown).

Because the amateur organist does not have the training to recognize or to locate specific keys quickly without study, but is able to recognize colors instantly, various keys in the great manual 18 are provided with matching color bars to show their chordal relationship. Hence, color bars 21 in green relate the keys F, A and C, as an F major chord. Likewise, color bars 22 in red, relate the keys G, B, and D, as the G major chord. Black bars 23 relate the keys G, C and E, as the C major chord.

A swell manual 25 has similar internally illuminated letters 26 which enable an unskilled amateur organist to find the particular melody notes quickly and easily while his eye can detect the color combination grouping without direct attention.

In summary, therefore, the present invention comprises generally the placing of a light beneath approximately an octave of the great manual. This light shines through translucent keys. Each key of that octave has embossed thereunder the identifying letter of the key, in order that a shadow of the letter appears on the key when the light is turned on. In addition, the keys are coded by translucent colored tape, in order that the three principal chords, namely C major, F major and G major are spelled out in distinctive colors of black, green and red, respectively. In addition, the swell manual has all of the keys embossed with the identifying letter, and the entire swell manual may be lighted to identify these melody notes.

Cooperating with the organ itself, is a special music book which is so prepared that one can play the music therein without having to read conventional music notation. This is done by printing the letter of the note above each note in the treble. This letter is used for playing the swell manual. In addition, each measure or partial measure is completely blocked into an area of color representing an appropriate chord. Thus, the novice holds down the group of notes of the appropriate color in the great manual to produce a chord, while playing the series of notes of the appropriate melody indicated by letter in the swell manual.

It has then been found to be of great practical value to color the major areas in the printed musical score to tie in with the note grouping in the great manual and thus make possible the coordination of the playing of melody by reading letters, and providing a chord background by observing color only. This combination of an organ with complementary music for beginners and the advanced amateur, provides a far superior combination than the mere indicating of key letters, illuminated or not, or otherwise providing visual aids to produce combinations into chords.

While the instant invention has been shown and described herein in what is conceived to be the most practical and preferred embodiments, it is recognized that departures may be made therefrom.

I claim:
1. A music system comprising:
a keyboard musical instrument including:
a keyboard having an octave of translucent keys,
a first plurality of said keys forming a first chord being illuminable from beneath to glow in a first color,
a second plurality of said keys forming a second chord being illuminable from beneath to glow in a second color,
a third plurality of said keys forming a third chord being illuminable from beneath to glow in a third color,
those of said keys included in more than one of said pluralities of said keys being illuminable from beneath to glow in more than one color, and
switch means for selectively activating the illumination key, and
whereby said keyboard musical instrument may be played in conjunction with a musical score having horizontally extending color areas composed of said three colors,
each of said areas extending horizontally for the duration of the interval during which the chord corresponding to that color is to be sounded.

2. The system of claim 1 wherein said instrument includes:
a second keyboard having translucent keys,
means for illuminating certain of the keys of said second keyboard from beneath, thereby to portray on each key the letter designation of that particular key, and
said score includes a staff with notes marked with the letter designation on the notes.

3. A music system comprising:
a keyboard musical instrument including;
a keyboard having at least one octave of translucent keys;
a first plurality of said keys forming a first chord being illuminable from beneath to glow in a first color,
a second plurality of said keys forming a second chord being illuminable from beneath to glow in a second color,
those of said keys included in more than one of said pluralities of said keys being illuminable from beneath to glow in more than one color, and
switch means for selectively activating the illumination of said keys,
whereby said keyboard musical instrument may be played in conjunction with a musical score having horizontally extending color areas composed of said two colors,
each of said areas extending horizontally for the duration of the interval during which the chord corresponding to that color is to be sounded.

References Cited

UNITED STATES PATENTS

| | | | |
|---|---|---|---|
| 383,011 | 5/1888 | Rice | 84—482 |
| 706,002 | 8/1902 | Allen | 84—478 XR |
| 877,911 | 2/1908 | Cross et al. | 84—451 |
| 1,009,194 | 11/1911 | Smith | 84—423 |
| 1,017,045 | 2/1912 | French et al. | 84—480 |
| 1,100,824 | 6/1914 | Grant | 84—482 |
| 1,270,657 | 6/1918 | Peters | 84—479 |
| 2,221,143 | 11/1940 | Lang | 84—478 |
| 2,284,868 | 6/1942 | Heaney | 84—478 |
| 2,406,946 | 9/1946 | Firestone | 84—423 |
| 3,069,959 | 12/1962 | Foufounis et al. | 84—477 |
| 3,141,371 | 7/1964 | Coles | 84—482 XR |

RICHARD B. WILKINSON, *Primary Examiner.*

S. A. WAL, *Assistant Examiner.*

U.S. Cl. X.R.

84—477

UNITED STATES PATENT OFFICE
CERTIFICATE OF CORRECTION

Patent No. 3,430,530                                         March 4, 1969

Gerard R. Grindinger

It is certified that error appears in the above identified patent and that said Letters Patent are hereby corrected as shown below:

Column 3, line 21, "key, and" should read -- of said keys --.

Signed and sealed this 7th day of April 1970.

(SEAL)
Attest:

Edward M. Fletcher, Jr.
Attesting Officer

WILLIAM E. SCHUYLER, JR.
Commissioner of Patents